United States Patent
Liu et al.

(10) Patent No.: US 12,454,596 B2
(45) Date of Patent: Oct. 28, 2025

(54) TWO PART CURABLE COMPOSITIONS

(71) Applicant: Henkel AG & Co. KGaA, Duesseldorf (DE)

(72) Inventors: Zhongwei Liu, Newington, CT (US); Donna M. Mamangun, Rocky Hill, CT (US); Ling Li, Glastonbury, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 375 days.

(21) Appl. No.: 18/114,388

(22) Filed: Feb. 27, 2023

(65) Prior Publication Data

US 2023/0220152 A1 Jul. 13, 2023

Related U.S. Application Data

(63) Continuation of application No. PCT/US2021/047446, filed on Aug. 25, 2021.

(60) Provisional application No. 63/069,973, filed on Aug. 25, 2020.

(51) Int. Cl.
| | | |
|---|---|---|
| *C08G 59/62* | (2006.01) | |
| *C08G 59/50* | (2006.01) | |
| *C08L 77/08* | (2006.01) | |

(52) U.S. Cl.
CPC ........ *C08G 59/623* (2013.01); *C08G 59/502* (2013.01); *C08L 77/08* (2013.01); *C08L 2205/025* (2013.01)

(58) Field of Classification Search
None
See application file for complete search history.

(56) References Cited

FOREIGN PATENT DOCUMENTS

| | | | |
|---|---|---|---|
| CN | 111777977 A | * 10/2020 | |
| WO | WO-2021130640 A1 | * 7/2021 | ........... C08G 59/223 |

OTHER PUBLICATIONS

Machine translation of CN 111777977 (Year: 2020).*

* cited by examiner

*Primary Examiner* — Megan McCulley
(74) *Attorney, Agent, or Firm* — Steven C. Bauman

(57) ABSTRACT

Two-part curable compositions capable of demonstrating substantially no phase separation at room temperature over time and improved adhesion strength retention at elevated temperature conditions.

15 Claims, No Drawings

TWO PART CURABLE COMPOSITIONS

BACKGROUND

Field

Two part curable compositions capable of demonstrating substantially no phase separation at room temperature over time and improved adhesion strength retention.

Brief Description of Related Technology

There is a need to improve stability and adhesion retention for epoxy formulations on both plastic and metal substrates. Existing epoxy products do not seem provide satisfactory adhesion retention if they show acceptable room temperature stability over time. Or other existing products do not seem to provide satisfactory room temperature stability over time if they show acceptable adhesion retention.

That need has been long felt, yet despite efforts heretofore has remained elusive.

Until now.

SUMMARY

As a solution to that problem, provided herein are compositions, comprising:
- (a) a polyamide made from the reaction product between a dimerized fatty acid and triethylenetetramine (or a member selected from diethylenetriamine, tetraethylenepentamine, and pentaethylenehexamine);
- (b) a polyamide made from the reaction product between a dimerized fatty acid and diethylene glycol diaminoalkyl ether; and
- (c) an epoxy-amine adduct made from the reaction product of diglycidyl ether of bisphenol-A and diethylene glycol diaminoalkyl ether; and
- (d) optionally, a polyamine; and
- (e) optionally, tris-2,4,6-(dimethylaminomethyl) phenol.

The so-provided compositions are capable of demonstrating substantially no phase separation at room temperature for a period of time of greater than about 6 months and/or maintaining a single-phase at room temperature for a period of time of greater than about 6 months.

Also provided herein are two part curable compositions comprising:

Part A: an epoxy resin, optionally substituted with one or more silane groups; and Part B: the so-provided compositions described herein.

The so-provided two part curable compositions are capable of demonstrating substantially no phase separation at room temperature for a period of time of greater than about 6 months, and when Part A and Part B are mixed together, dispensed onto a surface of a substrate constructed of epoxy or steel, and mated with another surface constructed of epoxy or steel, cured products thereof are capable of demonstrating at least one of the following physical properties: (a) lap shear strength on a surface constructed of epoxy of greater than or equal to about 3100 psi and lap shear strength retention at about 65° C. of greater than 50%; and (b) lap shear strength on a surface constructed of steel of greater than or equal to about 3200 psi and lap shear strength retention at about 65° C. of greater than 43%.

DETAILED DESCRIPTION

As noted above, provided herein are compositions, comprising:
- (a) a polyamide made from the reaction product between a dimerized fatty acid and triethylenetetramine (or a member selected from diethylenetriamine tetraethylenepentamine, and pentaethylenehexamine);
- (b) a polyamide made from the reaction product between a dimerized fatty acid and diethylene glycol diaminoalkyl ether; and
- (c) an epoxy-amine adduct made from the reaction product of diglycidyl ether of bisphenol-A and diethylene glycol diaminoalkyl ether; and
- (d) optionally, a polyamine; and
- (e) optionally, tris-2,4,6-(dimethylaminomethyl) phenol.

The so-provided compositions are capable of demonstrating substantially no phase separation at room temperature for a period of time of greater than about 6 months and/or maintaining a single-phase at room temperature for a period of time of greater than about 6 months.

These compositions include a polyamide made from the reaction product of a triethylenetetraamine (or a member selected from diethylenetriamine, tetraethylenepentamine and pentaethylenehexamine) and a dimerized fatty acid (that may be selected from tall oil fatty acid (TOFA), and other dimer acids including ones bearing C8 to C22, preferably C16 to C22 mono-carboxylic acids containing from 0 to about 4 units of unsaturation). Commercially available examples of this polyamide include Ancamide 350A (from Evonik), Versamid 140 (from Gabriel Chemicals), Epikure 3140 (from Hexion), Aradur 240 (from Huntsman) and LITE 3040 (from Cardolite).

This polyamide should be present in an amount of about 34 percent by weight or more, such as about 34 to about 45 percent by weight.

These compositions also include a polyamide made from the reaction product between a dimerized fatty acid (such as one produced from a diaminoalkylether and a polycarboxylic acid) and diethylene glycol diaminoalkyl ether (such as diethylene glycol diaminopropyl ether). Commercially available examples of this polyamide include Ancamide 910 (from Evonik).

This polyamide should be present in an amount of about 40 percent by weight or more, such as about 41 to about 47 percent by weight.

These compositions further include an epoxy-amine adduct made from the reaction product of diglycidyl ether of bisphenol-A and a diethylene glycol diaminoalkyl ether (such as diethylene glycol diaminopropyl ether). Commercially available examples of this polyamide include Ancamide 2638 (from Evonik).

The epoxy-amine adduct should be present in an amount of about 7 percent by weight or more, such as an amount of about 7 to about 10 percent by weight.

In addition, these compositions may include a polyamine. When present the polyamine may be selected from aliphatic polyamines, alicyclic polyamines, heterocyclic polyamines, aromatic polyamines, polyamines containing ether linkages in the backbone of the molecule and various mixtures thereof. For instance, the polyamine may be selected from ethylenediamine, diethylenetriamine, pentaethylenehexylamine, polyetherdiamine, diethylaminopropylamine, triethanolamine, dimethyl aminomethylphenol, bis(aminopropyl)piperazine, 4,4'-methylene-bis(cyclohexylamine), 2-methyl-1,5-pentanediamine and mixtures thereof. Desirably, the polyamine is tetraethylenepentamine.

When present, the polyamine is present in an amount of about 15 percent by weight or less, such as is present in an amount of about 4 to about 15 percent by weight.

And these compositions may include tris-2,4,6-(dimethylaminomethyl) phenol.

When present, the tris-2,4,6-(dimethylaminomethyl)phenol is present in an amount of about 10 percent by weight or less, such as is present in an amount of about 0.5 to about 5.0 percent by weight.

Also provided herein are compositions in a two part format comprising:

Part A: an epoxy resin, optionally substituted with one or more silane groups; and Part B: the composition provided as described above.

The Part A of the two part curable composition comprises an epoxy resin, optionally substituted with one or more silane groups. The epoxy resin may be selected from one or more of the following commercially available bisphenol A or F epoxy resins: Epon 828, Epon 863 (from Olin), DER 331 (from Hexion), GY 6010 (from Huntsman) or other similar bisphenol A or F epoxy resins.

The Part B of the two part curable composition demonstrates substantially no phase separation at room temperature for a period of time of greater than about 6 months, and when Part A and Part B are mixed together, dispensed onto a surface of a substrate constructed of epoxy or steel, and mated with another surface constructed of epoxy or steel, cured products thereof demonstrate at least one of the following physical properties: (a) lap shear strength on a surface constructed of epoxy of greater than or equal to about 3100 psi and lap shear strength retention at about 65° C. of greater than 50%; and (b) lap shear strength on a surface constructed of steel of greater than or equal to about 3200 psi and lap shear strength retention at about 65° C. of greater than 43%.

The examples below further illustrate the benefits and advantages provided.

EXAMPLES

In the table below a series of samples were prepared from the constituents listed. The order of addition is not material to the creation of the samples.

| Constituents | |
|---|---|
| Type | Identity |
| Polyamide (a) | Ancamide 350A |
| Polyamide (b) | Ancamide 910 A |
| Epoxy amine adduct (c) | Ancamine 2638 |
| Polyamine (d) | Epikure 3245 |
| Phenol (e) | Tris-2,4,6-(dimethylaminomethyl)phenol |

Ancamide 350A curing agent is a reactive liquid polyamide promoted for use in the curing of epoxy resins.

Ancamide 910 A curing agent is a versatile, flexible hardener designed for use with liquid epoxy resins.

EPIKURE-brand Curing Agents, like Epikure 3245, is unmodified aliphatic amine, which are used in a variety of applications including epoxy curing agents.

Ancamine 2638 curing agent is a modified aliphatic amine designed for use with liquid epoxy resins in two-part formulations.

These constituents were included in the samples in the table below in the order in which they are presented. Also included in each of the samples were Silane A 1120/OFS 6020 as a silane coupling agent in an amount of 0.99 percent by weight and Defoamer PC 1244 in an amount of 0.01 percent by weight.

| Sample/Amt (wt %) | | | | | | | | |
|---|---|---|---|---|---|---|---|---|
| A | B | C | D | E | F | G | H | I |
| 45 | 38.7 | 36.6 | 34.6 | 32.5 | 30.4 | 28.3 | 40.6 | |
| 45 | 46.7 | 44.2 | 41.7 | 39.2 | 36.6 | 34.2 | | 49.0 |
| 8 | 8.0 | 7.5 | 7.1 | 6.7 | 6.3 | 5.8 | 8.4 | |
| | 4.7 | 9.7 | 14.7 | 19.7 | 24.7 | 29.7 | 49.0 | 49.0 |
| 1 | 1 | 1 | 1 | 1 | 1 | 1 | 1 | 1 |

The samples were evaluated for appearance in terms of shelf life stability (remaining liquid, in a single phase at room temperature) and lap shear strength performance on epoxy and mild steel substrates after room temperature cure and at modest elevated temperature conditions (i.e., 65° C.) and for lap shear strength retention under modestly elevated temperature conditions (i.e., 65° C.). These data are captured below in the tables.

Here the appearance is observed for each of Samples A-I, in terms of stability and homogeneity (or lack thereof) at room temperature (unless otherwise noted) over time as noted.

| A | B | C | D | E | F | G | H | I |
|---|---|---|---|---|---|---|---|---|
| Stable | Stable | Stable | Stable | Not over (>4 wks @ 50 C.) | Not (<1 day) | Not (<1 day) | Not (<5 days) | Not (<3 days) |

Here lap shear strength on epoxy lap shears is observed for each of Samples A-I, initially at a 5 mil gap lap shear strength performance on epoxy substrates after room temperature cure and at modest elevated temperature conditions (i.e., 65° C.) and for lap shear strength retention under modestly elevated temperature conditions (i.e., 65° C.).

| A | B | C | D | E | F | G | H | I |
|---|---|---|---|---|---|---|---|---|
| 3572 | 3300 | 3167 | 3106 | 3260 | NT | NT | 3073 | 3107 |
| 1816 | 2146 | 1967 | 1940 | 2507 | NT | NT | 2410 | 1118 |
| 51% | 65% | 62% | 62% | 77% | NT | NT | 78% | 36% |

Samples F and G were not tested because if they are not observed to be stable over 24 hours, they would be impractical to meet market demands.

Here lap shear strength on epoxy lap shears is observed for each of Samples A-I, initially at a 5 mil gap lap shear strength performance on mild steel substrates after room temperature cure and at modest elevated temperature conditions (i.e., 65° C.) and for lap shear strength retention under modestly elevated temperature conditions (i.e., 65° C.).

| A | B | C | D | E | F | G | H | I |
|---|---|---|---|---|---|---|---|---|
| 4444 | 3257 | 3647 | 4124 | 3720 | NT | NT | 3423 | 2277 |
| 2122 | 1387 | 2080 | 2268 | 1810 | NT | NT | 2523 | 534 |
| 48% | 43% | 64% | 55% | 49% | NT | NT | 74% | 23% |

In addition, two commercial products sold by Henkel Corporation under the LOCTITE tradename were evaluated as well. Those products are: LOCTITE EA E-90FL and LOCTITE EA E-20HP.

Each of these products were stable. And they were evaluated as Samples A-I were. The results are shown below in the tables.

| Performance | E-90FL | E-20HP |
| --- | --- | --- |
| Lapshear Strength (psi) - Epoxy, 5 mil @ RT Cured | 2140 | 3533 |
| Lapshear Strength (psi) - Epoxy, 5 mil @ 65° C. | 596 | 1647 |
| Lapshear Strength Retention (%), @ 65° C. | 28 | 47 |

| Performance | E90FL | E-20HP |
| --- | --- | --- |
| Lapshear Strength (psi) - TS 101 (MS), 5 mil @ RT Cured | 1377 | 3203 |
| Lapshear Strength (psi) - TS101, 5 mil @ 65° C. | 179 | 718 |
| Lapshear Strength Retention (%), @ 65° C. | 13 | 22 |

In addition, LOCTITE EA E-90FL and LOCTITE EA E-20HP did not maintain 43% retention of adhesion strength on metal or plastic substrates at elevated temperatures.

What is claimed is:

1. A composition, comprising:
   (a) a polyamide made from the reaction product between a dimerized fatty acid and a member selected from the group consisting of diethylenetriamine tetraethylenepentamine, pentaethylenehexamine and triethylenetetramine;
   (b) a polyamide made from the reaction product between a dimerized fatty acid and diethylene glycol diaminoalkyl ether; and
   (c) an epoxy-amine adduct made from the reaction product of diglycidyl ether of bisphenol-A and diethylene glycol diaminoalkyl ether; and
   (d) optionally, a polyamine; and
   (e) optionally, tris-2,4,6-(dimethylaminomethyl) phenol.

2. The composition of claim 1, wherein the diethylene glycol diaminoalkyl ether of (b) or (c) is diethylene glycol diaminopropyl ether.

3. The composition of claim 1, wherein the polyamine of (d) is present.

4. The composition of claim 1, wherein the polyamine of (d) is selected from the group consisting of aliphatic polyamines, alicyclic polyamines, heterocyclic polyamines, aromatic polyamines, polyamines containing ether linkages in the backbone of the molecule and various mixtures thereof.

5. The composition of claim 1, wherein the polyamine of (d) is selected from the group consisting of ethylenediamine, diethylenetriamine, pentaethylenehexylamine, polyetherdiamine, diethylaminopropylamine, triethanolamine, dimethyl aminomethylphenol, bis(aminopropyl)piperazine, 4,4'-methylene-bis(cyclohexylamine), 2-methyl-1,5-pentanediamine and mixtures thereof.

6. The composition of claim 1, wherein the polyamine of (d) is tetraethylenepentamine.

7. The composition of claim 1, wherein the polyamine of (d) is present in an amount of about 15 percent by weight or less.

8. The composition of claim 1, wherein the polyamine of (d) is present in an amount of about 4 to about 15 percent by weight.

9. The composition of claim 1, wherein tris-2,4,6-(dimethylaminomethyl)phenol of (e) is present.

10. The composition of claim 1, wherein the epoxy-amine adduct of (c) is present in an amount of about 7 percent by weight or more.

11. The composition of claim 1, wherein the epoxy-amine adduct of (c) is present in an amount of about 7 to about 10 percent by weight.

12. The composition of claim 1, maintaining a single-phase at room temperature for a period of time of greater than about 6 months.

13. The composition of claim 1, demonstrating substantially no phase separation at room temperature for a period of time of greater than about 6 months.

14. A two part curable composition comprising:
   Part A: an epoxy resin, optionally substituted with one or more silane groups; and
   Part B: the composition of claim 1.

15. The composition of claim 14, wherein Part B demonstrates substantially no phase separation at room temperature for a period of time of greater than about 6 months, and wherein when Part A and Part B are mixed together, dispensed onto a surface of a substrate constructed of epoxy or steel, and mated with another surface constructed of epoxy or steel, cured products thereof demonstrate at least one of the following physical properties: (a) lap shear strength on a surface constructed of epoxy of greater than or equal to about 3100 psi and lap shear strength retention at about 65° C. of greater than 50%; and (b) lap shear strength on a surface constructed of steel of greater than or equal to about 3200 psi and lap shear strength retention at about 65° C. of greater than 43%.

* * * * *